US007779274B2

(12) United States Patent
Dublish et al.

(10) Patent No.: US 7,779,274 B2
(45) Date of Patent: *Aug. 17, 2010

(54) SYSTEMS AND METHODS FOR PROVIDING TIME-AND WEIGHT-BASED FLEXIBILITY TOLERANT HARDWARE ID

(75) Inventors: Pratul Dublish, Sammamish, WA (US); Caglar Gunyakti, Sammamish, WA (US); Aidan T. Hughes, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 239 days.

This patent is subject to a terminal disclaimer.

(21) Appl. No.: 11/874,075

(22) Filed: Oct. 17, 2007

(65) Prior Publication Data
US 2008/0040619 A1    Feb. 14, 2008

Related U.S. Application Data

(63) Continuation of application No. 10/337,064, filed on Jan. 6, 2003, now Pat. No. 7,302,590.

(51) Int. Cl.
*G06F 12/14* (2006.01)
(52) U.S. Cl. ..................................... 713/193
(58) Field of Classification Search ............ 713/193
See application file for complete search history.

(56) References Cited

U.S. PATENT DOCUMENTS 5,715,403 A    2/1998  Stefik ........................ 395/244

(Continued)

FOREIGN PATENT DOCUMENTS

WO    WO 00/72119 A2    11/2000

OTHER PUBLICATIONS

Beese, L.J. "Security Strategy for Networked Computers", *Proceedings of the 1987 Carnahan Conference on Security Technology: Electronic Crime Countermeasures*, 1987, 141-147.

(Continued)

*Primary Examiner*—Kambiz Zand
*Assistant Examiner*—Aubrey H Wyszynski
(74) *Attorney, Agent, or Firm*—Woodcock Washburn LLP

(57) ABSTRACT

Systems and methods for implementing a hardware ID with time- and weight-based flexibility use a hardware ID (HWID) including identifying information about hardware components. When software is run, a current HWID is generated. When the current HWID is compared to a stored HWID to determine if the two HWIDs match, a time vector and a weight vector are used in the comparison. A running matching score is kept of matches. For each hardware component, the weight vector indicates the weight given to a correct match of the hashed value for the hardware component. For example, if the weight value for the hardware component is three and there is a match, then the running total is increased by three. For each hardware component, the time vector may indicate an expiration period after which a change in the component may be allowed. For example, if the expiration period for the component is one year, and one year has passed since activation, the running total may be increased even though the component's information in the verification HWID does not match the current component information.

14 Claims, 4 Drawing Sheets

U.S. PATENT DOCUMENTS

| | | | | |
|---|---|---|---|---|
| 5,815,709 | A | * | 9/1998 | Waldo et al. ................ 712/300 |
| 6,148,407 | A | * | 11/2000 | Aucsmith .................... 726/16 |
| 6,243,468 | B1 | | 6/2001 | Pearce et al. ................ 380/255 |
| 6,327,652 | B1 | | 12/2001 | England et al. |
| 2001/0044782 | A1 | | 11/2001 | Hughes et al. ................ 705/59 |
| 2002/0038884 | A1 | | 4/2002 | Shirota et al. ............... 257/314 |
| 2002/0045303 | A1 | | 4/2002 | Lee ............................. 438/201 |
| 2002/0112176 | A1 | * | 8/2002 | Murray ....................... 713/200 |
| 2002/0147922 | A1 | * | 10/2002 | Hartinger et al. ............ 713/200 |
| 2003/0126456 | A1 | * | 7/2003 | Birzer et al. ................ 713/193 |
| 2004/0073789 | A1 | * | 4/2004 | Powers ....................... 713/165 |

OTHER PUBLICATIONS

Devanbu, P. et al., "Research Directions for Automated Software Verification; Using Trusted Hardware", *Proceedings. 12th IEEE International Conference Automated Software Engineering(Cat. No. 97TB100200)*, 1997, 274-279.

Griswold, G.N., "A Method for Protecting Copyright on Networks", *IMA Intellectual Property Project Proceedings,* 1994, 1(1), 169-178.

Kahn, R.E., "Deposit, Registration, and Recordation in an Electronic Copyright System", *IMA Intellectual Property Project Proceedings,* 1994, 1(1), 111-120.

Lindqvist, U. et al., "An Analysis of a Secure System Based on Trusted Components", *COMPASS '96. Proceedings of the Eleventh Annual Conference on Computer Assurance. Systems Integrity. Software Safety. Process Security(Cat.* No. 96CH35960), 1996, 213-223.

Smith, S.W. et al., "Trusting Trusted Hardware: Towards a Formal Model for Programmable Secure Coprocessors", *Proceedings of the 3rd USENIX Workshop on Electronic Commerce,* 1998, 83-98.

Weinberg, J. "Hardware-based ID, rights management, and trusted systems", *Journal,* 2000, 52(5), 1251-1281.

* cited by examiner

SYSTEMS AND METHODS FOR PROVIDING TIME-AND WEIGHT-BASED FLEXIBILITY TOLERANT HARDWARE ID

CROSS-REFERENCE TO RELATED APPLICATIONS

This application is a continuation of application Ser. No. 10/337,064 filed Jan. 6, 2003, and entitled, "SYSTEMS AND METHODS FOR PROVIDING TIME- AND WEIGHT-BASED FLEXIBLY TOLERANT HARDWARE ID," which is hereby incorporated by reference.

FIELD OF THE INVENTION

The present invention is directed to systems and methods for providing identifying information for a computer system and evaluating whether the computer system matches a saved version of identifying information. More particularly, the present invention relates to systems and methods for providing a hardware ID for a computer system based on identifying information from the computer system that is flexible and tolerant to normal changes that occur while using the computer system.

BACKGROUND OF THE INVENTION

Use of software is often governed by a software license. Because software can be easily copied after being sold, uses of software without an associated license is difficult to prevent. Such uses include piracy, where the software is illicitly replicated and pirated copies are installed for use on non-licensed computer systems. Additionally, a purchaser of a non-pirated copy might improperly use software outside of the scope of the associated license. For example, a user may install the software on more computer systems than are allowed under the license.

While licenses provide a legal avenue for recourse against such practices, they can be difficult to enforce in practice. Accordingly, there is a need for other means to reduce the amount of use of software outside of license terms. One such method is based on creating an identifier for the computer system of a user who has been licensed to use software. U.S. Pat. No. 6,243,468 entitled "Software Anti-Piracy System That Adapts to Hardware Upgrades" and published U.S. Patent Application Number 20010044782 detail this method.

Computer systems typically include various pieces of hardware, including disk drives, CDROM drives, and processors. These hardware components each have identifiers (serial numbers or names) that can be accessed by the system, for example by executing a plug-and-play (PnP) call. These component identifiers can be combined in a pre-determined manner to create a hardware identifier (HWID), which may be used to identify a particular computer system.

Significantly, the HWID may be employed as part of or in combination with a software license to ensure that software that was licensed for use on a specific computer system is used only on that computer system. In particular, software with a license specifying a HWID will only run on a computer system if, at runtime, the HWID computed for the computer system matches the HWID specified in the software license.

However, when the user of a computer system adds, subtracts, or exchanges components of the system, for example, for repair or upgrade purposes, the HWID changes. Each new or exchanged component will have a new component identifier. Thus, when the HWID for the system is computed, a new component identifier will cause the HWID to change. This causes problems when the user has received a license for software that specifies the HWID for a prior version of their computer system.

Accordingly, it is known to accept a stored HWID as a substantial match when compared to a newly calculated HWID and allow the user to run the software. For example, the abovementioned U.S. Pat. No. 6,243,468 discloses an instance in which five component identifiers are included in the HWID, and if any four of them are found to match, the software product is enabled to operate on the computer system.

Not addressed in the prior art is the fact that certain components may be exchanged more frequently than others. Also not addressed is the utility of having less stringent computer-system matching requirements for the license as time elapses, since the value of the software may decrease as time progresses. A HWID-based licensing system that addresses these facts would provide increased security and allow for dynamic security over time.

In view of the aforementioned situation, there is a need for a system that allows a HWID to be used for identifying and linking a licensed instantiation of software to one computer system, while tolerating changes in the computer system of a legitimate user with the flexibility required to accommodate hardware system changes and adapt to the passage of time.

SUMMARY OF THE INVENTION

In view of the foregoing, the present invention provides systems and methods for providing a HWID that will remain valid even if the system configuration is changed.

In one embodiment, when software is activated, the HWID of the system is calculated. Product activation code in the software or elsewhere in the system queries existing hardware components to obtain information regarding those components. For example, the network card may be queried to determine the MAC (media access control) address. The information regarding hardware components of each hardware component type is hashed. The hashed values are concatenated into a HWID.

The HWID calculated at activation is included in a license data file. Also included with the activation HWID are a time and a weight vector, containing a time and weight value for each hardware component. A threshold score is also included in the license data file. This license data file must be evaluated each time the software is used. When the license requires verification of the computer system, the HWID of the system is reevaluated and the newly calculated HWID is compared to the activation HWID.

When the newly calculated HWID is compared to the activation HWID to determine if the two HWIDs match, a time vector and a weight vector are used in the comparison. The time vector value for a component determines whether the component will be considered in determining if the newly calculated HWID substantially matches the activation HWID. The weight vector value for a component determines what weight a match for that component will be given in determining if the newly calculated HWID substantially matches the activation HWID.

Other features and embodiments of the present invention are described below.

BRIEF DESCRIPTION OF THE DRAWINGS

The system and methods for providing forward mapping with averaging and visibility in accordance with the present invention are further described with reference to the accompanying drawings in which.

DETAILED DESCRIPTION OF ILLUSTRATIVE EMBODIMENTS

Overview

In one embodiment, a current hardware ID (HWID) is calculated. For each component type from among a set of component types to be considered, components of that type are queried. In one embodiment, each result is hashed. The resulting values comprise the current HWID.

In one embodiment, a license file associated with software stores an activation HWID, a time vector, a weight vector, and a threshold score. In order to allow the use of the software, the current HWID for the computer system must substantially match the activation HWID. The time vector, the weight vector, and the threshold score are used in determining whether a substantial match occurs.

In order to determine whether the current HWID substantially matches the activation HWID, for each component type, each stored hashed value for components of that type is compared to a hashed value for each current component of that type. In one embodiment, a matching score is calculated for the overall comparison. Any match indicates that a component that existed in the system at the time the stored HWID was calculated still exists in the system. When such a match is found, the matching score for the comparison is incremented. If the matching score is greater than or equal to the threshold score, the current HWID substantially matches the activation HWID.

For each component type, the weight vector indicates the weight that a match of that component type should be accorded. When the matching score is incremented due to a match for a component type, the matching score is incremented by the weight value for that component type.

A time vector is also associated with the stored HWID. For each component type, the time vector may indicate an expiration period. After the expiration period has elapsed, even if no match is found for a component, the matching score is incremented by the weight value. In this way, a HWID system is provided which can give different weights to different components and which is increasingly flexibly tolerant of hardware changes in a computer system. In an alternate embodiment, only the time vector is used. In another alternate embodiment, only the weight vector is used.

Exemplary Computing Device

Figure 1:
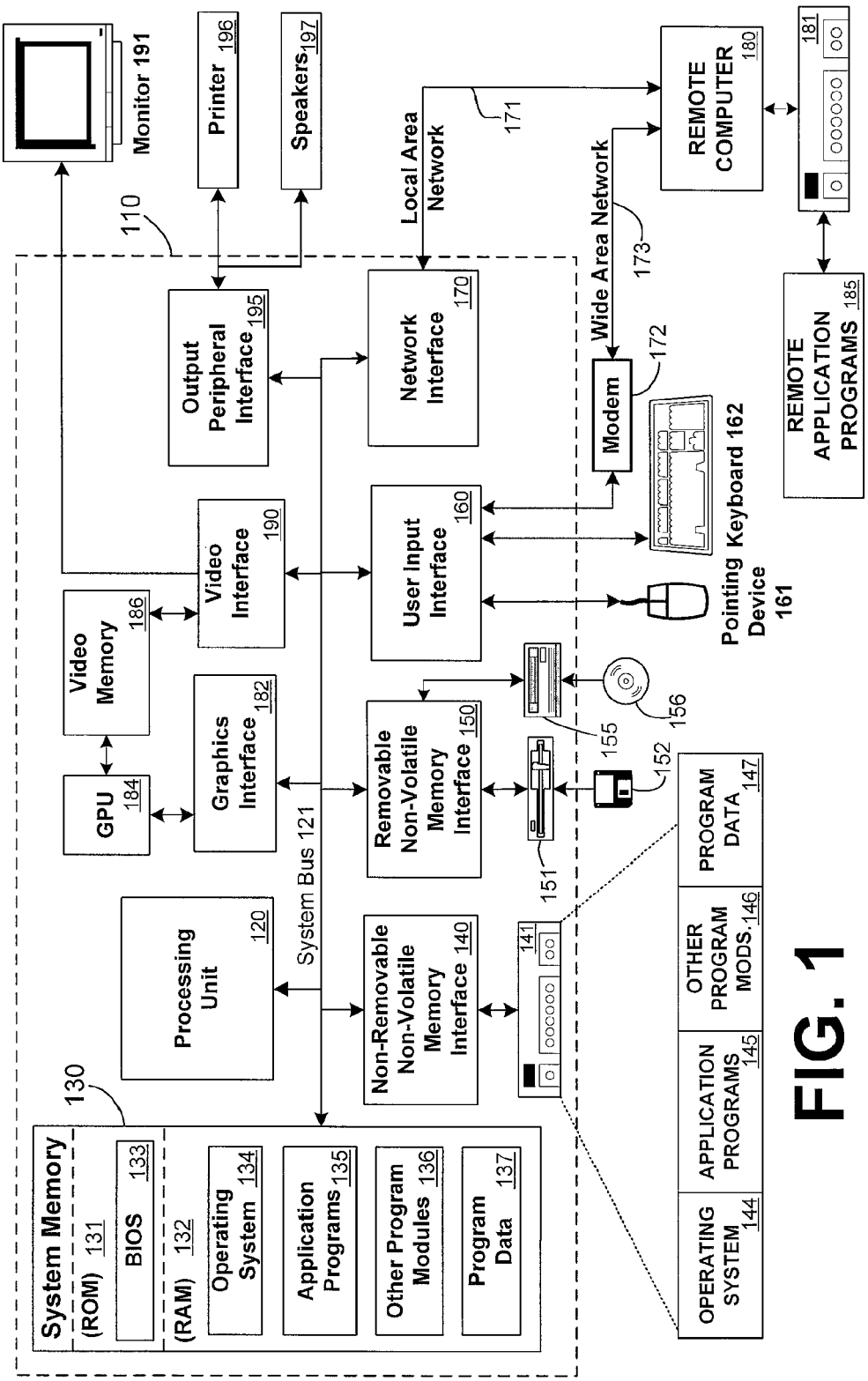
FIG. 1 is a block diagram representing an exemplary non-limiting computing system in which the present invention may be implemented.

FIG. 1 and the following discussion are intended to provide a brief general description of a suitable computing environment in which the invention may be implemented. It should be understood, however, that handheld, portable and other computing devices and computing objects of all kinds are contemplated for use in connection with the present invention, as described above. Thus, while a general purpose computer is described below, this is but one example, and the present invention may be implemented with other computing devices, such as a thin client having network/bus interoperability and interaction. Thus, the present invention may be implemented in an environment of networked hosted services in which very little or minimal client resources are implicated, e.g., a networked environment in which the client device serves merely as an interface to the network/bus, such as an object placed in an appliance, or other computing devices and objects as well. In essence, anywhere that data may be stored or from which data may be retrieved is a desirable, or suitable, environment for operation according to the invention.

Although not required, the invention can be implemented via an operating system, for use by a developer of services for a device or object, and/or included within application software that operates according to the invention. Software may be described in the general context of computer-executable instructions, such as program modules, being executed by one or more computers, such as client workstations, servers or other devices. Generally, program modules include routines, programs, objects, components, data structures and the like that perform particular tasks or implement particular abstract data types. Typically, the functionality of the program modules may be combined or distributed as desired in various embodiments. Moreover, those skilled in the art will appreciate that the invention may be practiced with other computer configurations. Other well known computing systems, environments, and/or configurations that may be suitable for use with the invention include, but are not limited to, personal computers (PCs), automated teller machines, server computers, hand-held or laptop devices, multi-processor systems, microprocessor-based systems, programmable consumer electronics, network PCs, appliances, lights, environmental control elements, minicomputers, mainframe computers and the like. The invention may also be practiced in distributed computing environments where tasks are performed by remote processing devices that are linked through a communications network/bus or other data transmission medium. In a distributed computing environment, program modules may be located in both local and remote computer storage media including memory storage devices, and client nodes may in turn behave as server nodes.

FIG. 1 thus illustrates an example of a suitable computing system environment 100 in which the invention may be implemented, although as made clear above, the computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

With reference to FIG. 1, an exemplary system for implementing the invention includes a general purpose computing device in the form of a computer system 110. Components of computer system 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

Computer system 110 typically includes a variety of computer readable media. Computer readable media can be any available media that can be accessed by computer system 110 and includes both volatile and nonvolatile media, removable and non-removable media. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, Random Access Memory (RAM), Read Only Memory (ROM), Electrically Erasable Programmable Read Only Memory (EEPROM), flash memory or other memory technology, Compact Disk Read Only Memory (CDROM), digital versatile disks (DVD) or other optical disk storage, magnetic cassettes, magnetic tape, magnetic disk storage or other magnetic storage devices, or any other medium which can be used to store the desired information and which can accessed by computer system 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer system 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer system 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156, such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through an non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1 provide storage of computer readable instructions, data structures, program modules and other data for the computer system 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer system 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus 121, but may be connected by other interface and bus structures, such as a parallel port, game port or a universal serial bus (USB). A graphics interface 182, such as Northbridge, may also be connected to the system bus 121. Northbridge is a chipset that communicates with the CPU, or host processing unit 120, and assumes responsibility for accelerated graphics port (AGP) communications. One or more graphics processing units (GPUs) 184 may communicate with graphics interface 182. In this regard, GPUs 184 generally include on-chip memory storage, such as register storage and GPUs 184 communicate with a video memory 186. GPUs 184, however, are but one example of a coprocessor and thus a variety of coprocessing devices may be included in computer system 110. A monitor 191 or other type of display device is also connected to the system bus 121 via an interface, such as a video interface 190, which may in turn communicate with video memory 186. In addition to monitor 191, computer systems may also include other peripheral output devices such as speakers 197 and printer 196, which may be connected through an output peripheral interface 195.

The computer system 110 may operate in a networked or distributed environment using logical connections to one or more remote computers, such as a remote computer 180. The remote computer 180 may be a personal computer, a server, a router, a network PC, a peer device or other common network node, and typically includes many or all of the elements described above relative to the computer system 110, although only a memory storage device 181 has been illustrated in FIG. 1. The logical connections depicted in FIG. 1 include a local area network (LAN) 171 and a wide area network (WAN) 173, but may also include other networks/buses. Such networking environments are commonplace in homes, offices, enterprise-wide computer networks, intranets and the Internet.

When used in a LAN networking environment, the computer system 110 is connected to the LAN 171 through a network interface or adapter 170. When used in a WAN networking environment, the computer system 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer system 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Various distributed computing frameworks have been and are being developed in light of the convergence of personal computing and the Internet. Individuals and business users alike are provided with a seamlessly interoperable and Web-enabled interface for applications and computing devices, making computing activities increasingly Web browser or network-oriented.

For example, MICROSOFT®'s .NET platform includes servers, building-block services, such as Web-based data storage and downloadable device software. While exemplary embodiments herein are described in connection with software residing on a computing device, one or more portions of the invention may also be implemented via an operating system, application programming interface (API) or a "middle man" object between any of a coprocessor, a display device and requesting object, such that operation according to the invention may be performed by, supported in or accessed via all of .NET's languages and services, and in other distributed computing frameworks as well.

Licensing Transaction

A licensing transaction occurs at or after a time when a user purchases a software product for running on a computer system 110. The software product, for example, may be a shrink-wrapped product having a software program stored on a transportable computer-readable medium, such as a DVD, CDROM, or floppy diskette. The software product may also be delivered electronically over a network. The user loads the software product onto computer system 110. However, the software may not be operable without license data. In order to receive this license data, the user must 'activate' the software by contacting an entity trusted by the licensor of the software, such as a license clearinghouse. This clearinghouse, for example, is the product manufacturer or an authorized third party. The activation process allows the customer to activate the software product for installation and use on a specific computer system by providing the customer with the necessary license data.

Contact with the clearinghouse may be from computer system 110 over a network such as the Internet or via a dial-up connection to a clearinghouse computer, which, if activation is successful, will send the license data to the computer system 110. Alternatively, the software product supports an activation with a graphical user interface (UI) dialog window asking the user to call a service representative at the clearinghouse. The UI window lists information which the user communicates to the service representative, and includes an entry box to enter license information as obtained from the service representative which is used to create the license data to enable use of the software.

Providing Time- and Weight-Based Flexibly Tolerant Hardware ID

In one embodiment, a license file associated with software includes an activation HWID, a time vector, a weight vector and a threshold score. When the license is to be checked, a current hardware ID (HWID) is calculated. For each component type from among a set of component types to be considered, components of that type are queried. Each result is hashed. The resulting values comprise the current HWID. In order to allow the use of the software, the current HWID for the computer system must substantially match the activation HWID. The time vector, the weight vector, and the threshold score are used in determining whether a substantial match occurs.

Figure 2:
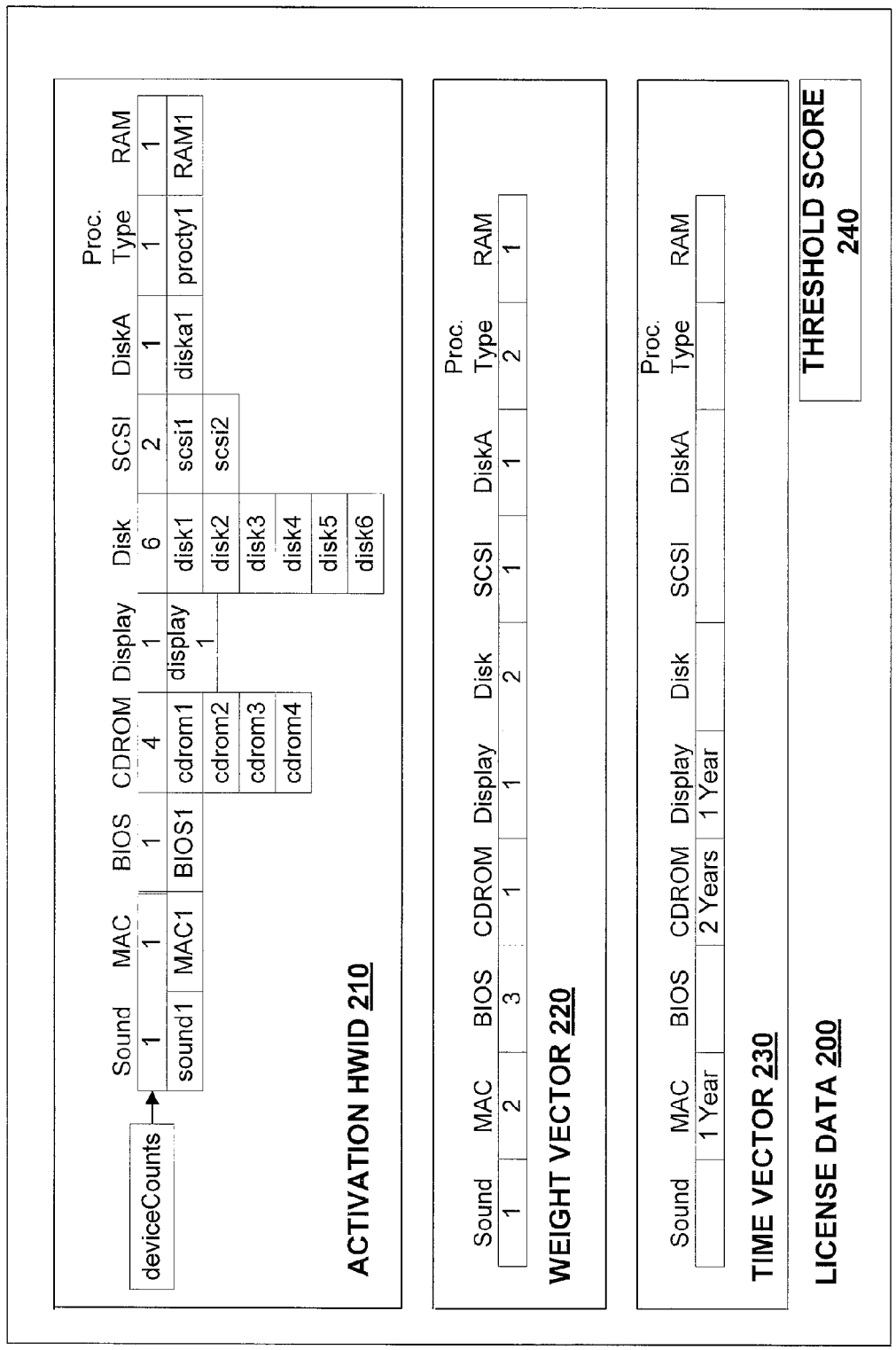
FIG. 2 is a block diagram representing license data in one embodiment of the invention.

In one embodiment, the license data 200 includes an activation HWID 210, a weight vector 220, a time vector 230, and a threshold score 240 as shown in FIG. 2. This information is used to determine at runtime whether the HWID of the current system indicates that it is acceptable to allow the use of the software on the current system.

In one embodiment, with reference to FIG. 1, the component types used to calculate a HWID are: the soundcard (located in the output peripheral interface 195); the network card (located in network interface 170), the BIOS 133; the CDROM drive 155, the display adapter (comprising the GPU 184); the disk device 151, the SCSI adapter, the disk adapter, the processor 120, and the RAM 132. Of course, other components may be employed without departing from the spirit and scope of the present invention, and any combination of one or more of these components may be used.

When a HWID is calculated, plug and play (PnP) queries or other queries are executed to determine the identifiers for these components. Some, such as the processor 120, may be identified by serial number. Others, such as the BIOS 133 may be identified by a portion of BIO 133, e.g. the first two kilobytes of the BIOS stored in ROM 131. The RAM 132, for example, may be identified by the total storage capacity thereof.

As a further example, the network card may be identified by a MAC address. The MAC (Media Access Control) address is a unique address that identifies the network card. On a local area network (LAN) or other network, the MAC address is used as the computer system's unique hardware number. When the computer system is connected to the Internet, this number is used to index the correct IP address for the computer system. The MAC address of a network card is a unique number that is burnt into the network card by its manufacturer. Blocks of addresses are assigned to each network-card manufacturer, and they are hard-coded into the chips on their network cards.

As shown, activation HWID 210 includes, for each component type, the number of components of that type that existed at activation. Activation HWID 210 also includes a value for each component. In one embodiment, the hardware identifiers are hashed to produce a hashed value, which is included in the HWID. For example, as shown in FIG. 2, four CDROMs were installed at the time of activation. In one embodiment, the hashed value for each component is stored in the HWID. For example, cdrom1, cdrom2, cdrom3, and cdrom4 are the hashed identifiers for the four CDROMs in exemplary activation HWID 210.

In one embodiment, the hash function used to hash the component identifiers is a modulus function. For example, the hashed value BIOS1 representing the BIOS component in HWID 210 might be the first two kilobytes of the BIOS, modulo 8. Of course, any other hash function may also be employed without departing from the spirit and scope of the present invention.

In one embodiment, also included in license data 200 is a weight vector 220 and a threshold score 240. When a newly calculated HWID is compared to an activation HWID 210 so that the determination can be made whether the computer system will be allowed to run the software corresponding to the license data 200, each component of a specific component type present in the system is queried. For each component present of a specific component type, the query is hashed to create a hashed component identifier. These hashed component identifiers are included in the newly calculated HWID.

The activation HWID and the newly-calculated HWID are compared. A running matching score total is kept. For each component type, if any of these hashed values for a component of that type in the newly calculated HWID matches any of the hashed values for that component type in activation HWID 210, then the matching score is incremented. After the matching score is computed, if the matching score is greater than or equal to the threshold score, the current HWID substantially matches the activation HWID. In another embodiment, the HWIDs must match exactly for the matching score to be incremented. In another embodiment, each component of a given type present in the activation HWID must be present in the newly calculated HWID for the matching score to be incremented for that component type. Other means for determining a match between the HWIDs for a component type are also contemplated, and may be employed without departing from the spirit and scope of the invention.

Weight vector 220 governs the amount of the increment. For example, a matching BIOS identifier will increment the matching score by three, whereas a matching CDROM identifier will only increment the matching score by one.

Additionally, in one embodiment, time vector 230 may be employed when calculating the matching score. For any component, if time vector 230 contains a value for that component, that is the expiration for the use of that component in comparing the two HWIDs. For example, in exemplary license data 200, as seen in FIG. 2, a time period is stored for some components. In the exemplarily license data 200, two years is the stored time period for the CDROM components. Thus, if two years have passed since licensing, a mismatched value corresponding to the CDROMs currently present on the computer system should not negatively affect the matching score. Therefore the matching score will be incremented by one (the value in weight vector 220) regardless of whether a CDROM is found on the computer system whose identifier matches the values stored in activation HWID 210 (viz. cdrom1, cdrom2, cdrom3, and cdrom4). In another embodiment, the matching score is incremented by a prespecified value (regardless of the weight vector 220 value) when the matching score is being incremented due to expiration rather than due to a match.

In order to allow expiration to occur, a license date may be included in license data 200. Alternatively, each time vector 230 value may be expressed as a set date. Additionally, security measures may be implemented to ensure that the resetting of a system clock does not foil the date comparison. Where no valid data exists in time vector 230 for a component type (in one embodiment, when the value is set to zero) the component is always used to determine the matching score. For example, time vector 230 indicates that only MAC, CDROM, and Display components expire. Other components do not.

Figure 3:
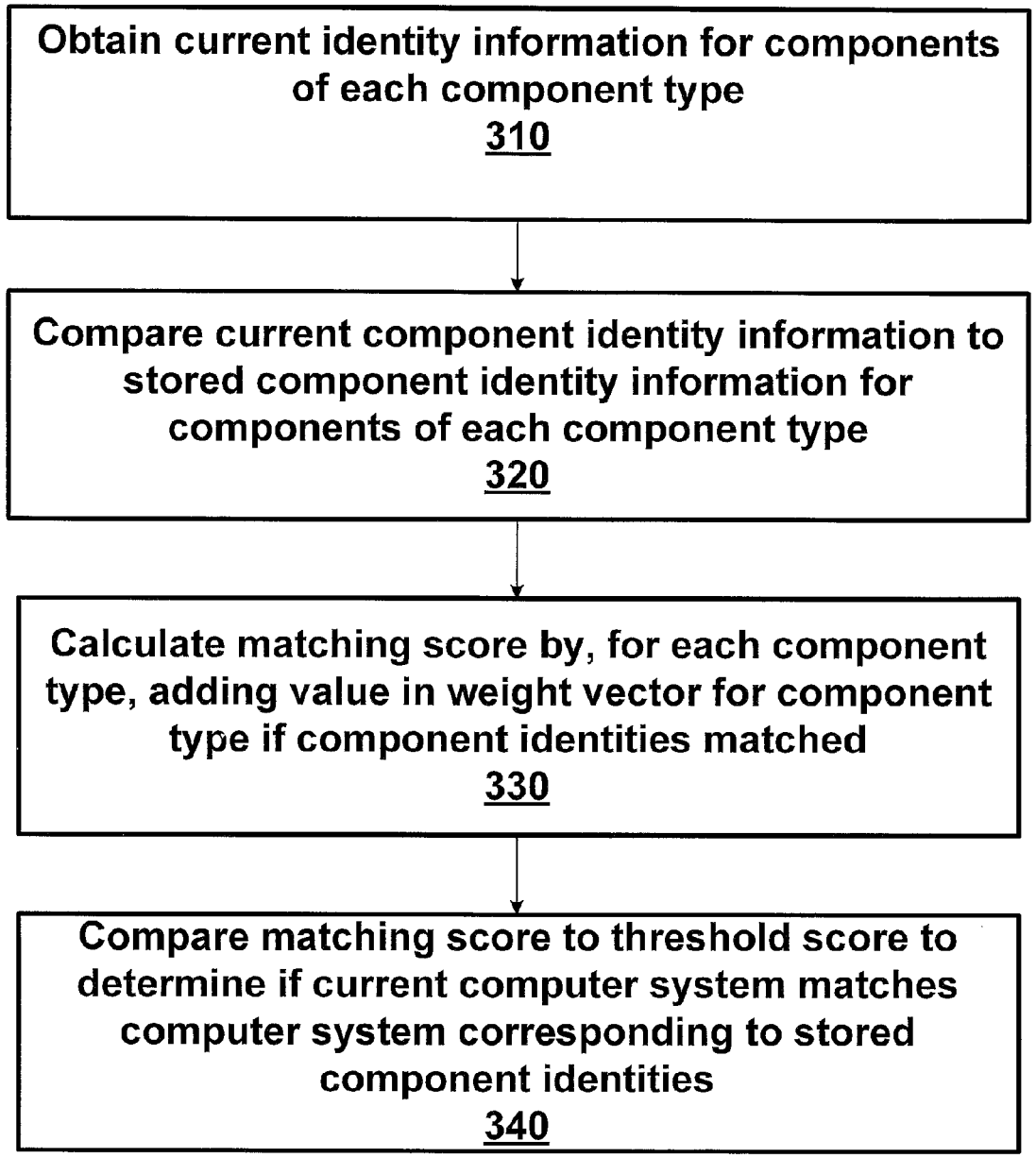
FIG. 3 is a block diagram representing a method of comparing each stored component identity with a current component identity, using a weight vector.

In one embodiment, only a weight vector but no time vector is included in the license data. In this embodiment, in order to compare two HWIDs, each component is considered, and the matching score is incremented only if there is a match. As shown in FIG. 3, in step 310, the current identity information for each of the relevant components of the system are obtained. In step 320, the current identity information is compared to the stored component identity information from the activation HWID. If a hash function is used, the identity information is hashed and compared to stored component identity information, which has also been hashed. In step 330, when there is a match for a given component type, a matching score is incremented by the value in the weight vector associated with that component type. And in step 340, after all components are considered, the matching score is compared to the threshold matching score to determine whether the match was successful. This test can be used in a number of ways. For example, if the comparison is being made to determine if a system is licensed to run software, if the match is successful, the computer system is permitted to run the software.

Figure 4:
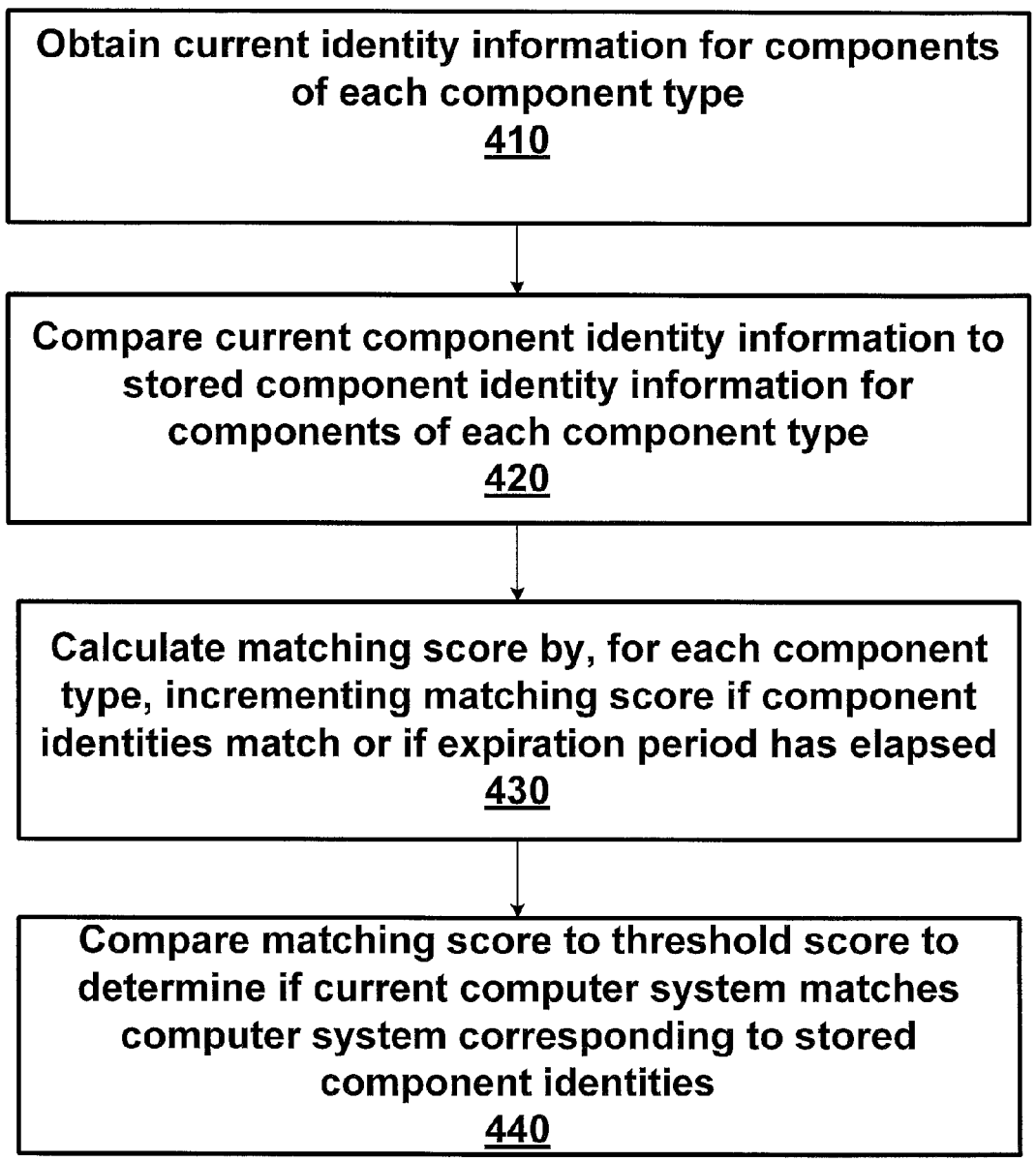
FIG. 4 is a block diagram representing a method of comparing each stored component identity with a current component identity, using a time vector.

In another embodiment, only a time vector, but no weight vector is included in the license data 200. In this embodiment, when a component match is found, the same value is added to the matching score, regardless of component type being compared. However, if the time value specified for the component type has elapsed, even if no match is found, the matching score will be incremented. As shown in FIG. 4, in step 410, the components of the HWID, the current identity information for each of the relevant components of the system are obtained. In step 420, the current identity information is compared to the stored component identity information from the activation HWID 210 In step 430, when there is a match for a given component type or where the expiration period has elapsed for that component type, the matching score is incremented. As before, in step 440, the matching score is compared to the threshold matching score to determine whether the match was successful.

In one embodiment, a matching score is included in the license data 200. In another embodiment, a matching score is hardcoded into the computation of whether a substantial match is present. Thus, license data 200 may include just a time vector, just a weight vector, or both a time and weight vector, and in any of these combinations may include a matching score or, alternatively, may rely on a matching score hard-coded into the computation of whether a substantial match is present.

Using a time vector, a weight vector, or both, the license is no longer passive data, but plays a role in license comparison data. The licensor or clearinghouse can have more control over the user experience. For example, the licensor may survey users and find that a significant percentage of them will change video cards every two years. This may cause the licensor to set the time value for video cards in new licenses to two years. Later, it may be determined that new video cards will be arriving in the marketplace in six months, and that most users will be changing their video card then. The licensor may set the time value to six months in new licenses. It may be determined that there is a wide variance in when users change CDROM drives, but other time values are very accurate in describing user behavior. This may cause the licensor to set the weight value for CDROM drives lower than the weight values for other components.

In one embodiment, a weight vector is used to react to changes in information regarding a user. A user gets a first license for software. Then, for example, when an evaluation period has expired, the user gets a second license for software. The first activation HWID is compared to the second activation HWID, and weight values for components are appropriately adjusted. In one such embodiment, the components that have been changed are given increased weight relative to components that have not been changed. This reflects an assumption that a recently changed component will not be changed again. In another such embodiment, the components that have been changed are given decreased weight relative to components that have not been changed. This reflects an assumption that the user is likely to be testing or changing components that the user has historically changed.

CONCLUSION

As mentioned above, while exemplary embodiments of the present invention have been described in connection with various computing devices and network architectures, the underlying concepts may be applied to any computing device or system in which it is desirable to implement a hardware ID. Thus, the methods and systems of the present invention may be applied to a variety of applications and devices. For instance, the algorithm(s) of the invention may be applied to the operating system of a computing device, provided as a separate object on the device, as part of another object, as a downloadable object from a server, as a "middle man" between a device or object and the network, as a distributed object, etc. While exemplary programming languages, names and examples are chosen herein as representative of various choices, these languages, names and examples are not intended to be limiting. One of ordinary skill in the art will appreciate that there are numerous ways of providing object code that achieves the same, similar or equivalent systems and methods achieved by the invention.

The various techniques described herein may be implemented in connection with hardware or software or, where appropriate, with a combination of both. Thus, the methods and apparatus of the present invention, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. In the case of program code execution on programmable computers, the computing device will generally include a processor, a storage medium readable by the processor (including volatile and non-volatile memory and/or storage elements), at least one input device, and at least one output device. One or more programs that may utilize the signal processing services of the present invention, e.g., through the use of a data processing API or the like, are preferably implemented in a high level procedural or object oriented programming language to communicate with a computer. However, the program(s) can be implemented in assembly or machine language, if desired. In any case, the language may be a compiled or interpreted language, and combined with hardware implementations.

The methods and apparatus of the present invention may also be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, a video recorder or the like, or a receiving machine having the signal processing capabilities as described in exemplary embodiments above becomes an apparatus for practicing the invention. When implemented on a general-purpose processor, the program code combines with the processor to provide a unique apparatus that operates to invoke the functionality of the present invention. Additionally, any storage techniques used in connection with the present invention may invariably be a combination of hardware and software.

While the present invention has been described in connection with the preferred embodiments of the various figures, it is to be understood that other similar embodiments may be used or modifications and additions may be made to the described embodiment for performing the same function of the present invention without deviating therefrom. Furthermore, it should be emphasized that a variety of computer platforms, including handheld device operating systems and other application specific operating systems are contemplated, especially as the number of wireless networked devices continues to proliferate. Still further, the present invention may be implemented in or across a plurality of processing chips or devices, and storage may similarly be effected across a plurality of devices. Therefore, the present invention should not be limited to any single embodiment, but rather should be construed in breadth and scope in accordance with the appended claims.

What is claimed:

1. A computing device for enabling enforcement of software licensing terms for a software product for use with the computing device, the computing device comprising:

one or more components, each component having a component identity obtainable from the computing device and identifying the component and a component type from among a set of component types;

at least one storage area for program code and data; and a processor for executing the program code, wherein the program code directs the computing device to perform the functions comprising:

retrieving license data corresponding to the licensing terms;

for each component type from among said set of component types, obtaining an associated current component identity of a corresponding component from said computer system;

for each component type from among said set of component types, comparing said obtained associated current component identity to an associated stored component identity from the retrieved license data;

calculating a matching score by, for each component type from among said set of component types, if the result of said comparison is positive as a match, by incrementing the matching score by adding a stored associated component type weight corresponding to each component type from among said set of component types from the retrieved license data to said matching score;

comparing said matching score to a threshold matching score from the retrieved license data, and honoring a right granted by the licensing terms with respect to the software product if the matching score exceeds the threshold matching score.

2. The computing device of claim 1, wherein, for each component type from among said set of component types, obtaining an associated current component identity comprises obtaining an associated individual current component identity for every component of that component type.

3. The computing device of claim 2, wherein for at least one component type from among said set of hardware component types, said associated stored component identity comprises one or more associated individual stored component identities, and wherein, for each component type from among said set of component types, comparing said associated existing component identity to an associated stored component identity comprises returning a positive result if any of said associated individual stored component identities matches any of said associated individual current component identities.

4. The computing device of claim 2, wherein for at least one component type from among said set of hardware component types, said associated stored component identity comprises one or more associated individual stored component identities, and wherein, for each component type from among said set of component types, comparing said associated existing component identity to an associated stored component identity comprises returning a positive result if all of said associated individual stored component identities matches any of said associated individual current component identities.

5. The computing device of claim 1, wherein, for each component type from among said set of component types, obtaining an associated existing component identity comprises:
- querying a hardware component of the hardware component type for a query result; and
- hashing the query result.

6. The computing device of claim 1, wherein calculating a matching score by, for each component type from among said set of component types, if the result of said comparison is positive, incrementing a matching score by adding a stored associated component type weight comprises:
- for each component type, determining if an associated expiration period has passed; and
- for each component type, if said expiration period has passed, adding said stored associated component type weight.

7. The computing device of claim 1, wherein calculating a matching score by, for each component type from among said set of component types, adding a stored associated component type weight comprises:
- for each component type, determining if an associated expiration period has passed; and
- for each component type, if said expiration period has passed, adding a prespecified expired-period increment.

8. The computing device of claim 1, where said set of component types comprises one or more selected from among the following:
- soundcard, network card, BIOS, CDROM drive, display adapter, disk device, SCSI adapter, disk adapter, processor, and RAM.

9. A computing device for enabling enforcement of software licensing terms for a software product for use with the computing device, the computing device comprising:
- one or more components, each component having a component identity obtainable from the computing device and identifying the component, and a component type from among a set of component types;
- at least one storage area for program code and data; and
- a processor for executing the program code, wherein the program code directs the computing device to perform the functions comprising:
  - retrieving license data corresponding to the licensing terms;
  - for each component type from among said set of component types, obtaining an associated current component identity of a corresponding component from said computer system;
  - for each component type from among said set of component types, comparing said obtained associated current component identity to an associated stored component identity from the retrieved license data;
  - calculating a matching score by, for each component type from among said set of component types, if the result of said comparison is positive as a match or if an associated expiration period corresponding to at least one component type from among said set of component types from the retrieved license data has passed, by incrementing said matching score;
  - comparing said matching score to a threshold matching score from the retrieved license data, and
  - honoring a right granted by the licensing terms with respect to the software product if the matching score exceeds the threshold matching score.

10. The computing device of claim 9, wherein, for each component type from among said set of component types, obtaining an associated current component identity comprises obtaining an associated individual current component identity for every component of that component type.

11. The computing device of claim 10, wherein for at least one component type from among said set of hardware component types, said associated stored component identity comprises one or more associated individual stored component identities, and wherein, for each hardware component type from among said set of hardware component types, comparing said associated existing component identity to an associated stored component identity comprises returning a positive result if any of said associated individual stored component identities matches any of said associated individual current component identities.

12. The computing device of claim 10, wherein for at least one component type from among said set of hardware component types, said associated stored component identity comprises one or more associated individual stored component identities, and wherein, for each hardware component type from among said set of hardware component types, comparing said associated existing component identity to an associated stored component identity comprises returning a positive result if all of said associated individual stored component identities matches any of said associated individual current component identities.

13. The computing device of claim 9, wherein, for each hardware component type from among a set of hardware component types, obtaining an associated existing component identity comprises:
- querying a hardware component of the hardware component type for a query result; and
- hashing the query result.

14. The computing device of claim 9, where said set of component types comprises one or more selected from among the following:
- soundcard, network card, BIOS, CDROM drive, display adapter, disk device, SCSI adapter, disk adapter, processor, and RAM.

* * * * *